United States Patent [19]

Rice

[11] Patent Number: 4,474,586
[45] Date of Patent: Oct. 2, 1984

[54] GAS SEPARATION PROCESS
[75] Inventor: Arthur W. Rice, Durham, N.C.
[73] Assignee: Monsanto Company, St. Louis, Mo.
[21] Appl. No.: 557,979
[22] Filed: Dec. 5, 1983
[51] Int. Cl.³ .............................................. B01D 59/14
[52] U.S. Cl. ............................................ 55/16; 55/68
[58] Field of Search ............................ 55/16, 68, 158
[56] References Cited

U.S. PATENT DOCUMENTS

| 3,250,080 | 5/1966 | Garwin | 55/16 X |
| 3,442,002 | 5/1969 | Geary, Jr. et al. | 55/158 X |
| 3,713,271 | 1/1973 | Franz et al. | 55/158 X |
| 3,930,814 | 1/1976 | Gessner | 55/16 |
| 4,119,417 | 10/1978 | Heki et al. | 55/158 |
| 4,230,463 | 10/1980 | Henis et al. | 55/158 X |
| 4,397,661 | 8/1983 | King et al. | 55/158 |

Primary Examiner—Robert Spitzer
Attorney, Agent, or Firm—R. L. Broad

[57] ABSTRACT

Process for recovering a permeating gas from a pair of gas streams one of which contains less than 30 percent of the permeating gas and the other of which contains more than 70 percent of the permeating gas wherein the other gas stream is brought into contact with a membrane through which a portion of the permeating gas passes. Non-permeating gases are mixed with the one stream and brought into contact with another membrane through which the permeating gas will pass, with the permeating gases from the membrane being combined and collected.

4 Claims, 2 Drawing Figures

GAS SEPARATION PROCESS

BACKGROUND OF THE INVENTION

1. Field of the Invention

This invention relates to processes for recovering permeable gases from two gas streams containing differing percentages of the permeable gas.

2. Prior Art

It is known to separate certain gases, such as hydrogen, from gas mixtures, such as hydrogen and methane, by using membrane separation techniques. In this operation, the gas mixture is brought into contact with a membrane permeable to the gases to be separated from the mixture, with a pressure differential being maintained across the membrane to cause the gases to permeate the membrane. High recovery rates and purities can be achieved.

It is also known to combine two gas streams to form a mixture which is then brought into contact with a membrane for separation of certain gases from the mixture by permeation techniques. This works well if both gas streams contain about the same percentage of the permeable gas. However, if the percentage of permeable gases in the two streams are significantly different, the percentage recovery or purity of the permeated gases will be low.

SUMMARY OF THE INVENTION

A process for recovering a permeating gas from a pair of gas streams one of which contains less than about 30 percent of the permeating gas and the other of which contains more than about 70 percent of the permeating gas wherein the gas streams are brought into contact with separate permeable membranes under pressure differentials such that a portion of the more permeable gas passes from each stream through its respective membrane and is thereby separated from the mixture. Non-permeating gases from the gas stream having the higher percentage of the permeating gas are mixed with the gas stream having the lower percentage of permeating gas prior to its contact with the membrane. Permeating gases from the two membranes are then combined and collected.

DETAILED DESCRIPTION OF THE INVENTION

Figure 1:
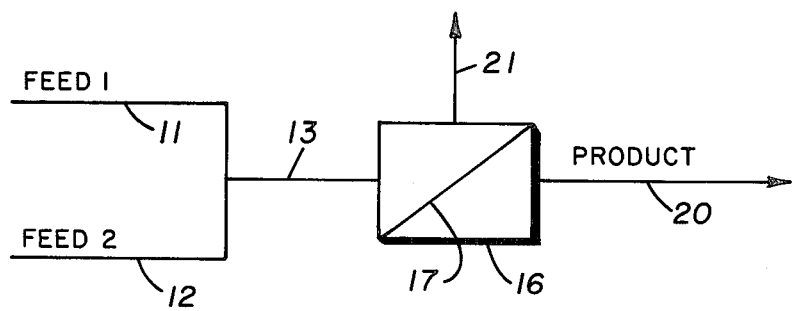
FIG. 1 is a schematic view showing the prior art method of combining two gas mixtures into one stream which is then fed into contact with a membrane for separating one or more gases from the mixture.

Referring now in detail to the drawings, there is shown in FIG. 1 feed lines 11 and 12 carrying different gas mixtures of different composition percentages which are fed through a line 13 into a membrane separator 16 of a known type having a permeable membrane 17 such as those disclosed in U.S. Pat. no. 4,230,463. One gas of the mixture permeates the membrane and is withdrawn as a product through a line 20. Non-permeated gases are vented through a line 21. This is included as a comparison.

Figure 2:
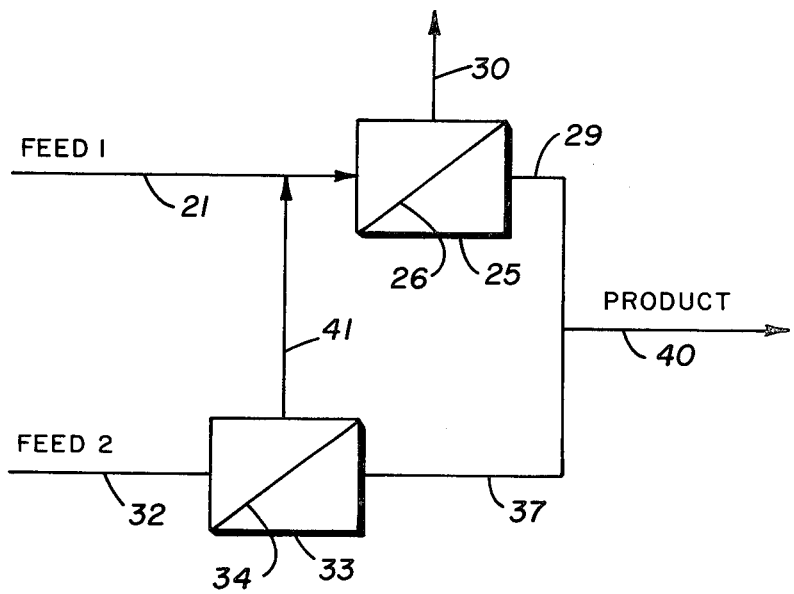
FIG. 2 is a schematic view showing apparatus for carrying out the process of the present invention.

FIG. 2 shows apparatus for carrying out the process of this invention. A first gas mixture having a low content of a permeable gas is fed through a line 21 into a membrane separator 25 having a membrane 26 such as that disclosed in U.S. Pat. No. 4,230,463. One of the gases permeates the membrane 25 and is withdrawn through a line 29, non-permeated gases being vented through a line 30.

A second gas mixture having a high content of the permeable gas is fed through a line 32 into a second membrane separator 33 having a membrane 34. The gas which permeates the membrane 34 is withdrawn through a line 37 and combined with the gas in line 29 to be carried off through a line 40.

Non-permeated gases from the second separator 33 are fed through a line 41 into the line 21 to be mixed with the first gas mixture being fed to the first separator 25.

This invention is especially useful in those cases where the compositions of the two gas streams differ widely in the content of the permeable gas. Desirable results are achieved when the gas mixture fed into the system through the line 21 contains less than about 30 percent of the more permeable gas and the gas mixture fed into the system through the line 32 contains more than about 70 percent of the more permeable gas. Preferably, the difference between the percentage content of the more permeable gas of the two streams will be at least 50. The best results are achieved when the gas mixture passing through the line 21 contains less than about 20 percent of the more permeable gas and the gas mixture passing through the line 32 contains more than 80 percent of the more permeable gas.

The performance of the system of FIG. 2 can be expressed in terms of a "performance parameter", which is the product of the purity and percent recovery of the more permeable gas passing through the line 40. The feed gas mixtures fed into the system through the lines 21 and 32 preferably differ to the point that the performance parameter, expressed as a decimal, is at least 0.6. Preferably a performance parameter of at least 0.7 will be achieved.

Sufficient work has been done that computers can be used to accurately predict the behavior of a system using membrane separators. Computer simulations were done using various combinations of feed gas mixtures for the system shown in FIGS. 1 and 2, FIG. 2 being the system used for carrying out the process of this invention. Examples 1–4 in the Table below show the results of these computer simulations. It should be noted that the same amount of effective membrane area was used in the systems of FIG. 1 (comparison) and FIG. 2 (this invention). In other words, in the examples the sum of the areas of the membranes 26 and 34 is the same as the area of the membrane 17.

For the computer simulations, the sum of the areas of the membranes 26 and 34 of FIG. 2 were equivalent to the area of the membrane 17 of FIG. 1 in order to fairly compare the two systems. The area of the membrane 34 was selected to give a 90 percent purity of the more permeable gas in the line 37, with the area of membrane 26 being sufficient that the sums of the areas of the membranes 26 and 34 were the same as the area of the membrane 17.

In Example 1, the effective area of the membrane 17 was 8,085 square meters, with 3,120 square meters being used for the membrane 34 and 4,965 square meters being used for the membrane 26.

In Example 2, 10,180 square meters of the membrane 17 was used, with 4,385 square meters being used for membrane 34 and 5,795 square meters being used for the membrane 26.

In Example 3, 6,315 square meters of the membrane 17 were used, with 5,995 square meters being used for the membrane 34 and 320 square meters being used for the membrane 26.

In Example 4, 12,675 square meters of the membrane 17 were used, with 5,995 square meters being used for the membrane 34 and 6,680 square meters being used for the membrane 26.

It can readily be seen that, where the two feed gas mixtures contain widely differing percentages of the more permeable gas, high performance parameters can be achieved.

I claim:

1. A process for recovering a permeating gas from a pair of gas streams one of which contains less than 30 percent of the permeating gas and the other of which contains more than 70 percent of said permeating gas, comprising
   (a) bringing the one gas stream into contact with a first membrane more permeable to the permeating gas than other gases in the stream to remove a portion of said permeating gas from said one stream;
   (b) bringing the other gas stream into contact with a second membrane more permeable to the permeating gas than other gases of the stream to remove a portion of said permeating gas from said other stream;
   (c) mixing non-permeated gases from the second membrane with said one gas stream upstream of said first membrane, and
   (d) combining the permeated gases removed from said one and said other stream.

2. The process of claim 1 wherein said process has a performance parameter of at least 0.6.

3. The process of claim 2 wherein said process has a performance parameter of at least 0.7.

4. The process of claim 1 wherein the difference between the percentages of said permeating gas in said one stream and the percentage of said permeating gas in said other stream is at least 50.

* * * * *

UNITED STATES PATENT AND TRADEMARK OFFICE
CERTIFICATE OF CORRECTION

PATENT NO. : 4,474,586
DATED : October 2, 1984
INVENTOR(S) : Arthur W. Rice

It is certified that error appears in the above—identified patent and that said Letters Patent is hereby corrected as shown below: In column 2, after line 53, insert the following table.

TABLE

Figure 1

| Example | %H2 Feed 1 | Feed 2 | H2 Recovery % | H2 Purity % | Performance Parameter |
|---------|------------|--------|---------------|-------------|----------------------|
| 1 | 20 | 80 | 67.3 | 84.1 | 0.566 |
| 2 | 20 | 70 | 70.2 | 79.0 | 0.554 |
| 3 | 50 | 60 | 64.1 | 88.2 | 0.565 |
| 4 | 20 | 60 | 72.9 | 73.0 | 0.532 |

UNITED STATES PATENT AND TRADEMARK OFFICE
CERTIFICATE OF CORRECTION

PATENT NO. : 4,474,586  
DATED : October 2, 1984  
INVENTOR(S) : Arthur W. Rice

It is certified that error appears in the above—identified patent and that said Letters Patent is hereby corrected as shown below:

Figure 2 (This Invention)

| H2 Recovery % | H2 Purity % | Performance Parameter |
|---|---|---|
| 81.6 | 86.9 | 0.709 |
| 79.8 | 81.3 | 0.649 |
| 51.4 | 84.6 | 0.435 |
| 79.7 | 74.5 | 0.594 |

Signed and Sealed this

Thirteenth Day of August 1985

[SEAL]

Attest:

DONALD J. QUIGG

Attesting Officer    Acting Commissioner of Patents and Trademarks